(12) United States Patent
Bhatia et al.

(10) Patent No.: US 10,360,568 B2
(45) Date of Patent: Jul. 23, 2019

(54) CUSTOMER STATE-BASED TARGETING

(75) Inventors: Tarun Bhatia, Burbank, CA (US); Eric Theodore Bax, Pasadena, CA (US)

(73) Assignee: Excalibur IP, LLC, New York, NY (US)

( * ) Notice: Subject to any disclaimer, the term of this patent is extended or adjusted under 35 U.S.C. 154(b) by 2037 days.

(21) Appl. No.: 12/726,518

(22) Filed: Mar. 18, 2010

(65) Prior Publication Data
US 2011/0231243 A1 Sep. 22, 2011

(51) Int. Cl.
*G06Q 30/02* (2012.01)

(52) U.S. Cl.
CPC ......... *G06Q 30/02* (2013.01); *G06Q 30/0244* (2013.01); *G06Q 30/0246* (2013.01); *G06Q 30/0254* (2013.01); *G06Q 30/0255* (2013.01)

(58) Field of Classification Search
CPC .................................................. G06Q 30/02
USPC ........................................................ 705/14
See application file for complete search history.

(56) References Cited

U.S. PATENT DOCUMENTS

| | | | |
|---|---|---|---|
| 7,664,726 B2 | 2/2010 | Jain et al. | |
| 7,774,229 B1 | 8/2010 | Dernehl et al. | |
| 2008/0005313 A1* | 1/2008 | Flake et al. | ............ 709/224 |
| 2008/0103952 A1 | 5/2008 | Flake et al. | |
| 2008/0133342 A1 | 6/2008 | Criou et al. | |
| 2008/0235088 A1 | 9/2008 | Weyer | |
| 2008/0249844 A1* | 10/2008 | Abe et al. | ............ 705/10 |
| 2009/0006188 A1 | 1/2009 | Guo et al. | |

OTHER PUBLICATIONS

International Search Report and Written Opinion for App. PCT/US2011/025088, dated Aug. 30, 2011, 9 pp.
U.S. Appl. No. 12/726,556, filed Mar. 18, 2010, Bhatia et al.
U.S. Appl. No. 12/726,610, filed Mar. 18, 2010, Bhatia et al.
U.S. Appl. No. 12/726,683, filed Mar. 18, 2010, Bhatia et al.
U.S. Appl. No. 13/094,640, filed Apr. 26, 2011, Nussel et al.

* cited by examiner

*Primary Examiner* — Patricia H Munson
(74) *Attorney, Agent, or Firm* — Mauriel Kapouytian Woods LLP; Lana Akopyan; James Woods

(57) ABSTRACT

Techniques are provided for targeting of online advertisements. Methods are provided which include classifying an individual into a state, of a set of possible states, relative to relationship with regard to an offering or brand. The classification may be based on offline and online information. The states may relate to a degree of favorability with which the individual is disposed with regard to the offering or brand. The individual is targeted with an online advertisement based at least in part on the state into which the individual is classified.

20 Claims, 14 Drawing Sheets

CUSTOMER STATE-BASED TARGETING

BACKGROUND

Behavior of individuals both online and offline, such as in connection with a brand of an advertiser, can be relevant in advertisement targeting as well as online and offline advertising campaign optimization. Yet existing techniques for advertising campaign management and optimization, and advertisement targeting, fail to optimally utilize offline and online information in an integrated, unified or holistic fashion.

There is a need for techniques for use in advertising campaign management and optimization, and for use in advertisement targeting, which utilize or better utilize both offline and online information, including offline and online behavior of individuals.

SUMMARY

Some embodiments of the invention provide techniques for targeting of online advertisements, including targeting based on a brand-associated customer state, such as a conversion-associated state or a brand favorability state. In some embodiments, methods are provided which include classifying an individual into a state, of a set of possible states, relative to conversion or relationship with regard to a brand or offering. The classification may be based on offline and online information. The states may relate to a degree of favorability with which the individual is disposed with regard to the brand. The individual is targeted with an online advertisement based at least in part on the state into which the individual is classified.

In some embodiments, techniques are provided for targeting of online advertisements, including targeting of top customers of advertisers. In some embodiments, methods are provided in which information including a top set of customers of an advertiser is obtained. Information is obtained relating to online and offline behavior of the top customers in association with one or more brands of the advertiser. For a particular top customer, based at least in part on behavior information relating to the particular top customer in association with the one or more brands, the particular top customer is targeted with an online advertisement.

Some embodiments provide techniques relating to advertising campaign optimization utilizing online and offline behavior information, such as in a unified, integrated, holistic or synergistic fashion. Information is obtained relating to online and offline behavior of set of individuals in association with a brand associated with an advertising campaign. Based at least in part on the information, one or more metrics are determined reflecting an association between online advertising and offline behavior relating to the brand, or vice versa. Optimization is performed for at least one parameter of an online advertising campaign or an offline advertising campaign based at least in part on at least one of the one or more metrics.

Some embodiments of the invention provide techniques relating to advertising campaign optimization, such as techniques that utilize offline behavior information in optimizing one or more online advertising campaign parameters, such as a pricing or payment-associated parameter. In some embodiments, information is obtained relating to online advertising, associated with a brand associated with an online advertising campaign, directed to each of a set of individuals. Information is also obtained relating to offline behavior of the individuals in association with the brand. One or more metrics are determined that are associated with a relationship between the online advertising and the offline behavior. Optimization of at least one parameter of the online advertising campaign is performed based at least in part on at least one of the one or more metrics.

While the invention is described with reference to the above drawings, the drawings are intended to be illustrative, and the invention contemplates other embodiments within the spirit of the invention.

DETAILED DESCRIPTION

Figure 1:
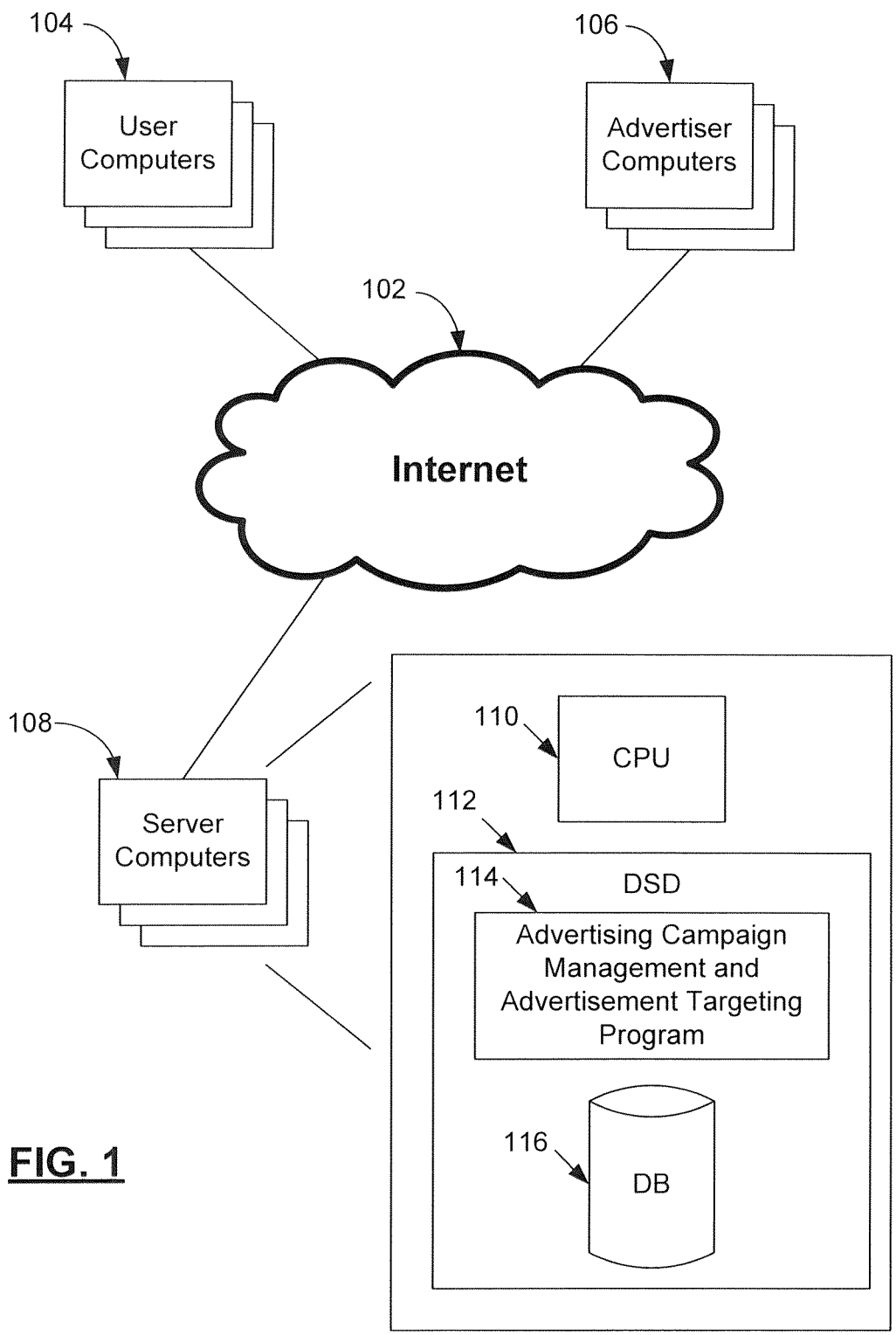
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich media advertisements, video advertisements, etc.

As depic-ted, each of the server computers 108 includes one or more CPUs 110 and a data storage device 112. The data storage device 112 includes a database 116 and an Advertising Campaign Management and Advertisement Targeting Program 114.

The Program 114 is intended to broadly include all programming, applications, algorithms, software and other tools necessary to implement or facilitate methods and systems according to embodiments of the invention, including embodiments relating to customer state-based targeting, top customer targeting, online and offline advertising campaign optimization, and offline metrics in advertising campaign optimization. The elements of the Program 114 may exist on a single server computer or be distributed among multiple computers or devices.

Figure 2:
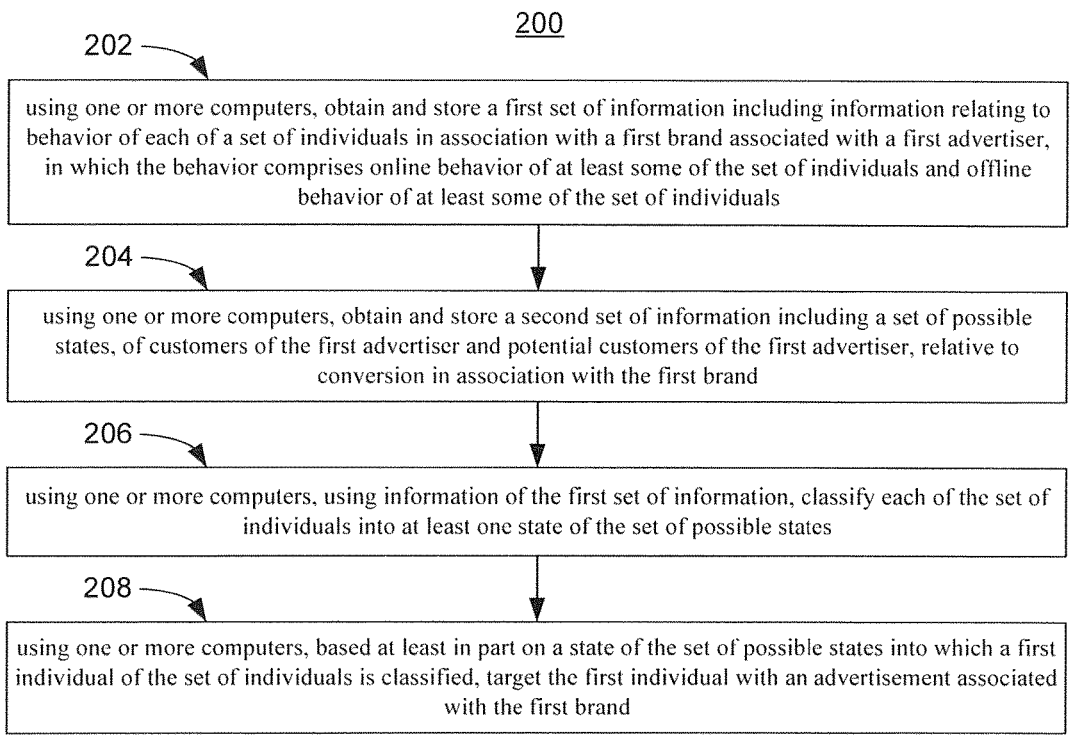
FIG. 2 is a flow diagram illustrating a method according to one embodiment of the invention.

FIG. 2 is a flow diagram illustrating a method 200 according to one embodiment of the invention. At step 202, using one or more computers, a first set of information is obtained and stored, including information relating to behavior of each of a set of individuals in association with a first brand associated with a first advertiser. The behavior comprises online behavior of at least some of the set of individuals and offline behavior of at least some of the set of individuals.

At step 204, using one or more computers, a second set of information is obtained and stored, including a set of possible states, of customers of the first advertiser and potential customers of the first advertiser, relative to conversion in association with the first brand.

At step 206, using one or more computers, using information of the first set of information, each of the set of individuals is classified into at least one state of the set of possible states.

At step 208, using one or more computers, based at least in part on a state of the set of possible states into which a first individual of the set of individuals is classified, the first individual is targeted with an advertisement associated with the first brand.

Figure 3:
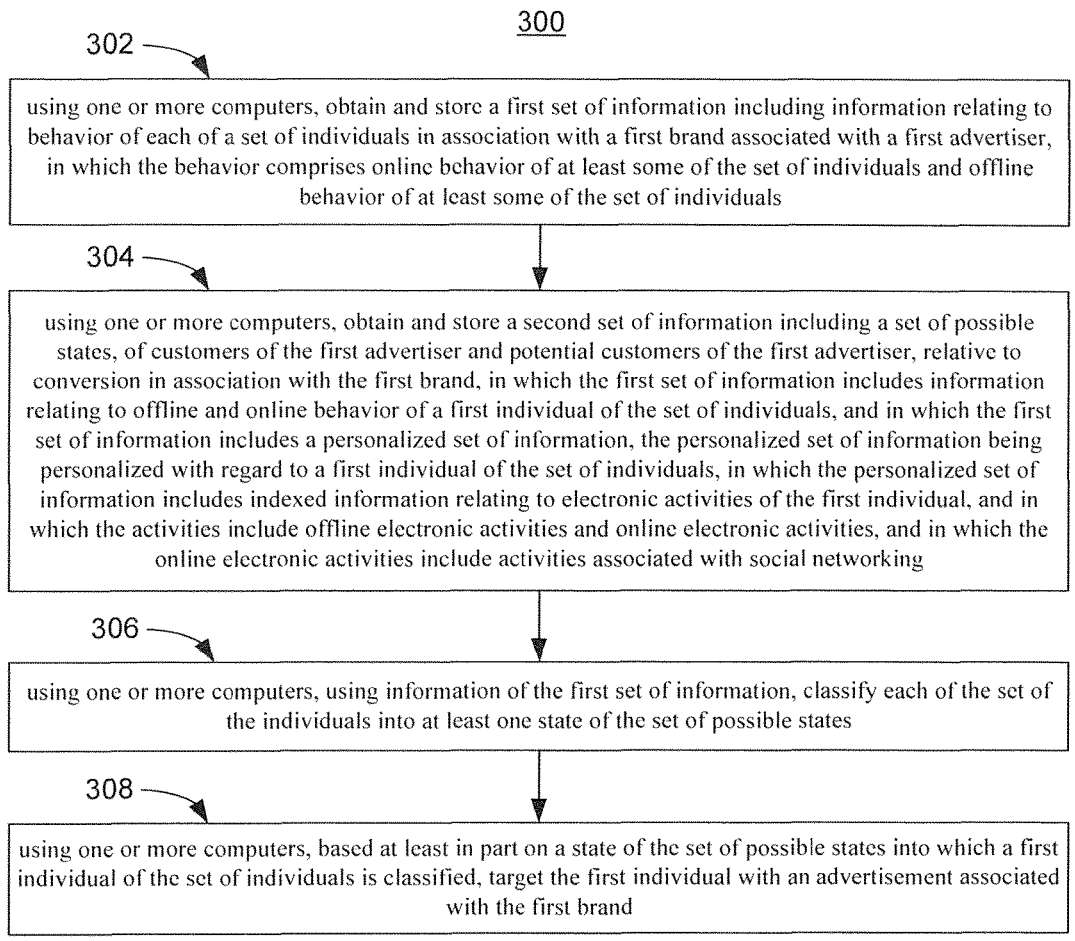
FIG. 3 is a flow diagram illustrating a method according to one embodiment of the invention.

FIG. 3 is a flow diagram illustrating a method 300 according to one embodiment of the invention. At step 302, using one or more computers, a first set of information is obtained and stored, including information relating to behavior of each of a set of individuals in association with a first brand associated with a first advertiser. The behavior comprises online behavior of at least some of the set of individuals and offline behavior of at least some of the set of individuals.

At step 304, using one or more computers, a second set of information is obtained and stored, including a set of possible states, of customers of the first advertiser and potential customers of the first advertiser, relative to conversion in association with the first brand. The first set of information includes information relating to offline and online behavior of a first individual of the set of individuals. Furthermore, first set of information includes a personalized set of information. The personalized set of information is personalized with regard to a first individual of the set of individuals. Furthermore, the personalized set of information includes indexed information relating to electronic activities of the first individual. The electronic activities include offline electronic activities and online electronic activities. Furthermore, the online electronic activities include activities associated with social networking.

At step 306, using one or more computers, using information of the first set of information, each of the set of the individuals is classified into at least one state of the set of possible states.

At step 308, using one or more computers, based at least in part on a state of the set of possible states into which a first individual of the set of individuals is classified, the first individual is targeted with an advertisement associated with the first brand.

Figure 4:
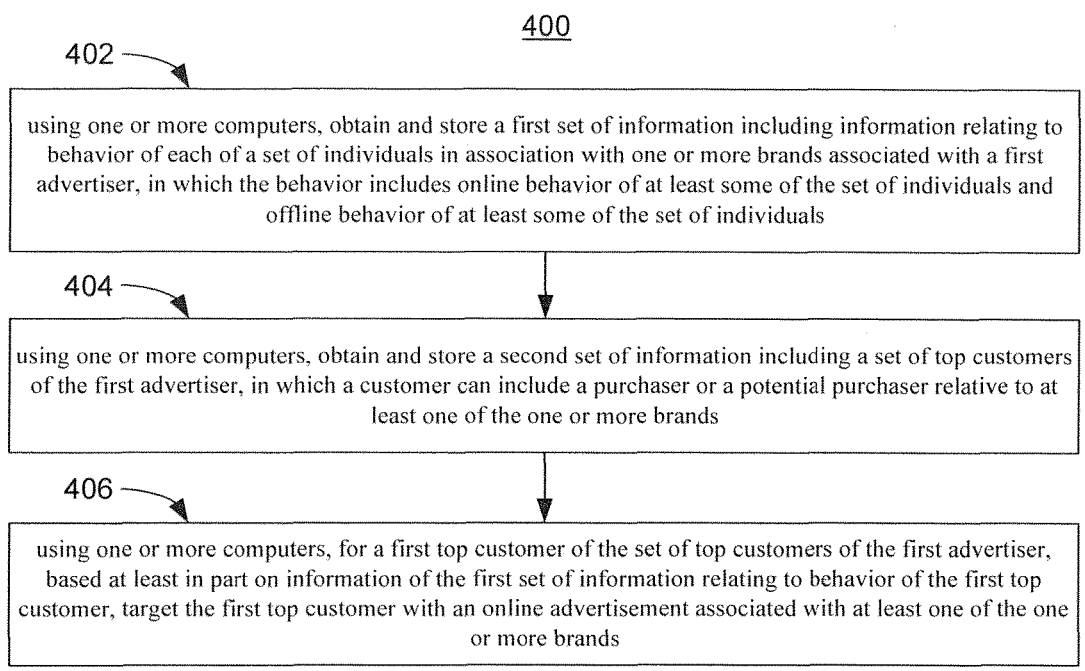
FIG. 4 is a flow diagram illustrating a method according to one embodiment of the invention.

FIG. 4 is a flow diagram illustrating a method 400 according to one embodiment of the invention. At step 402, using one or more computers, a first set of information is obtained and stored, including information relating to behavior of each of a set of individuals in association with one or more brands associated with a first advertiser. The behavior includes online behavior of at least some of the set of individuals and offline behavior of at least some of the set of individuals.

At step 404, using one or more computers, a second set of information is obtained and stored, including a set of top customers of the first advertiser, in which a customer can include a purchaser or a potential purchaser relative to at least one of the one or more brands.

At step 406, using one or more computers, for a first top customer of the set of top customers of the first advertiser, based at least in part on information of the first set of information relating to behavior of the first top customer, the first top customer is targeted with an online advertisement associated with at least one of the one or more brands.

Figure 5:
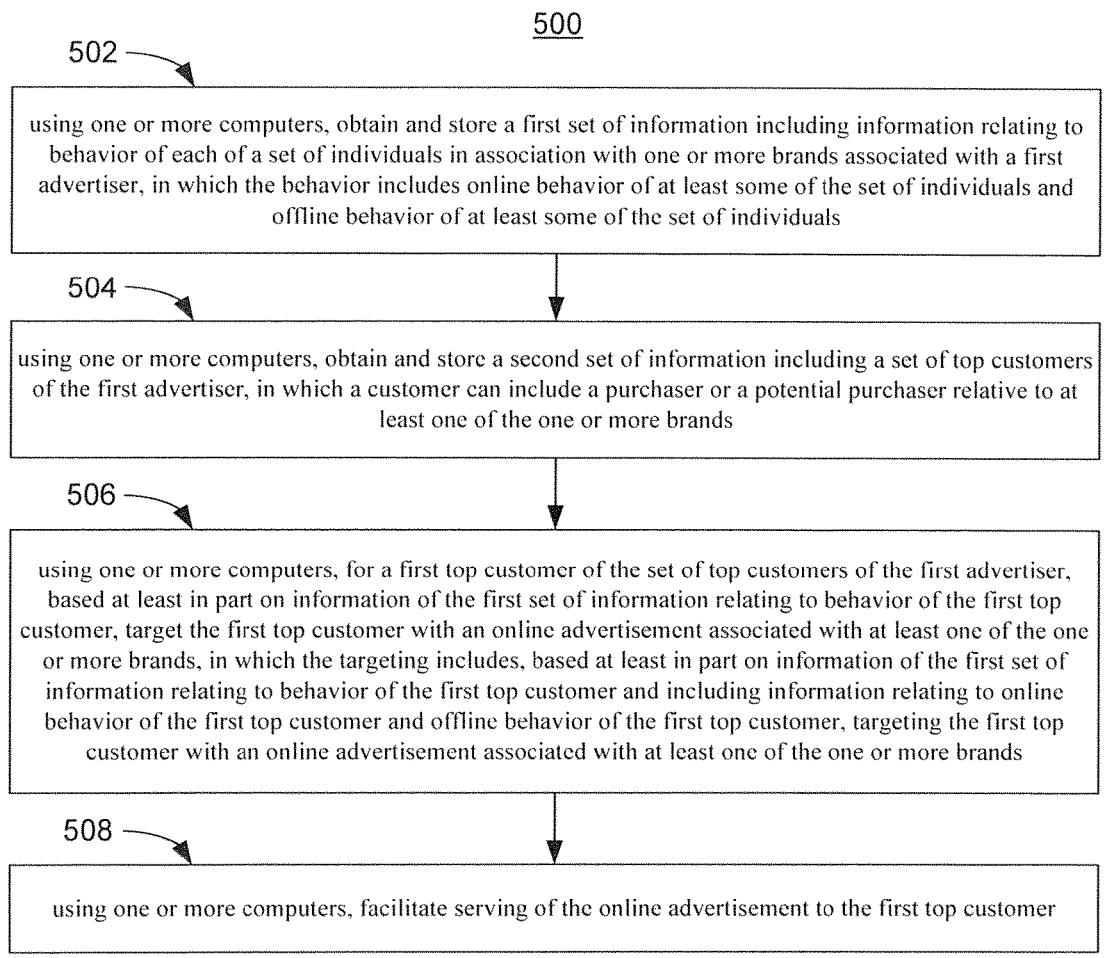
FIG. 5 is a flow diagram illustrating a method according to one embodiment of the invention.

FIG. 5 is a flow diagram illustrating a method 500 according to one embodiment of the invention. At step 502, using one or more computers, a first set of information is obtained and stored, including information relating to behavior of each of a set of individuals in association with one or more brands associated with a first advertiser. The behavior includes online behavior of at least some of the set of individuals and offline behavior of at least some of the set of individuals.

At step 504, using one or more computers, a second set of information is obtained and stored, including a set of top customers of the first advertiser, in which a customer can include a purchaser or a potential purchaser relative to at least one of the one or more brands.

At step 506, using one or more computers, for a first top customer of the set of top customers of the first advertiser, based at least in part on information of the first set of information relating to behavior of the first top customer, the first top customer is targeted with an online advertisement associated with at least one of the one or more brands. The targeting includes, based at least in part on information of the first set of information relating to behavior of the first top customer and including information relating to online behavior of the first top customer and offline behavior of the first top customer, targeting the first top customer with an online advertisement associated with at least one of the one or more brands.

At step 508, using one or more computers, serving is facilitated of the online advertisement to the first top customer.

Figure 6:
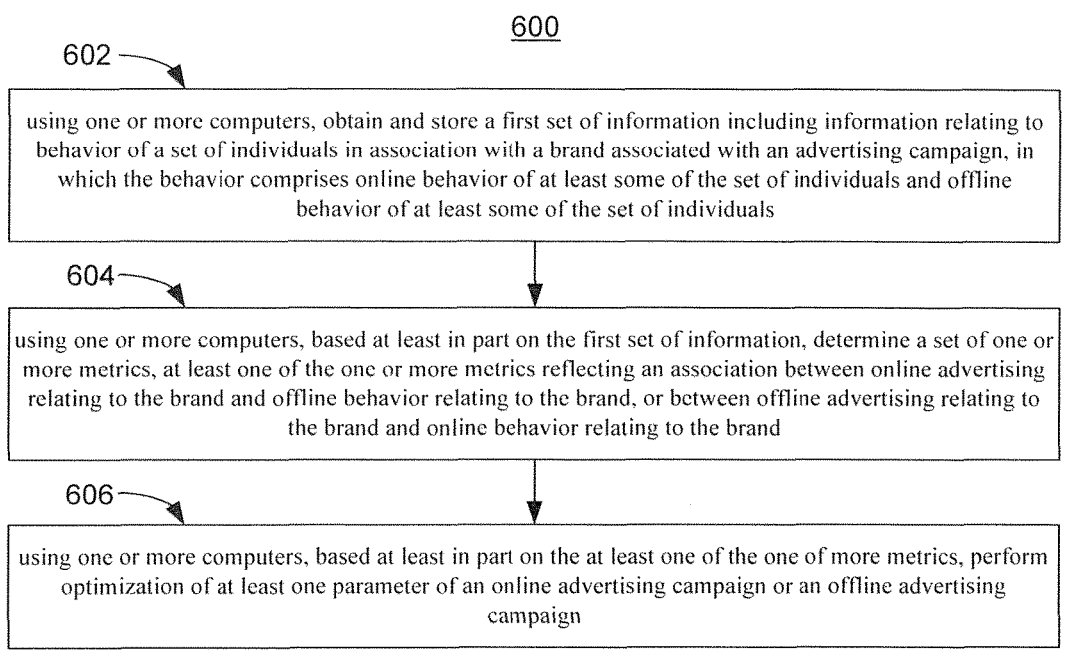
FIG. 6 is a flow diagram illustrating a method according to one embodiment of the invention.

FIG. 6 is a flow diagram illustrating a method 600 according to one embodiment of the invention. At step 602, using one or more computers, a first set of information is obtained and stored, including information relating to behavior of a set of individuals in association with a brand associated with an advertising campaign. The behavior comprises online behavior of at least some of the set of individuals and offline behavior of at east some of the set of individuals.

At step 604, using one or more computers, based at least in part on the first set of information, a set of one or more metrics is determined. At least one of the set of one or more metrics reflects an association between online advertising relating to the brand and offline behavior relating to the brand, or between offline advertising relating to the brand and online behavior relating to the brand.

At step 606, using one or more computers, based at least in part on the at least one of one of more metrics, optimization is performed of at least one parameter of an online advertising campaign or an online advertising campaign.

Figure 7:
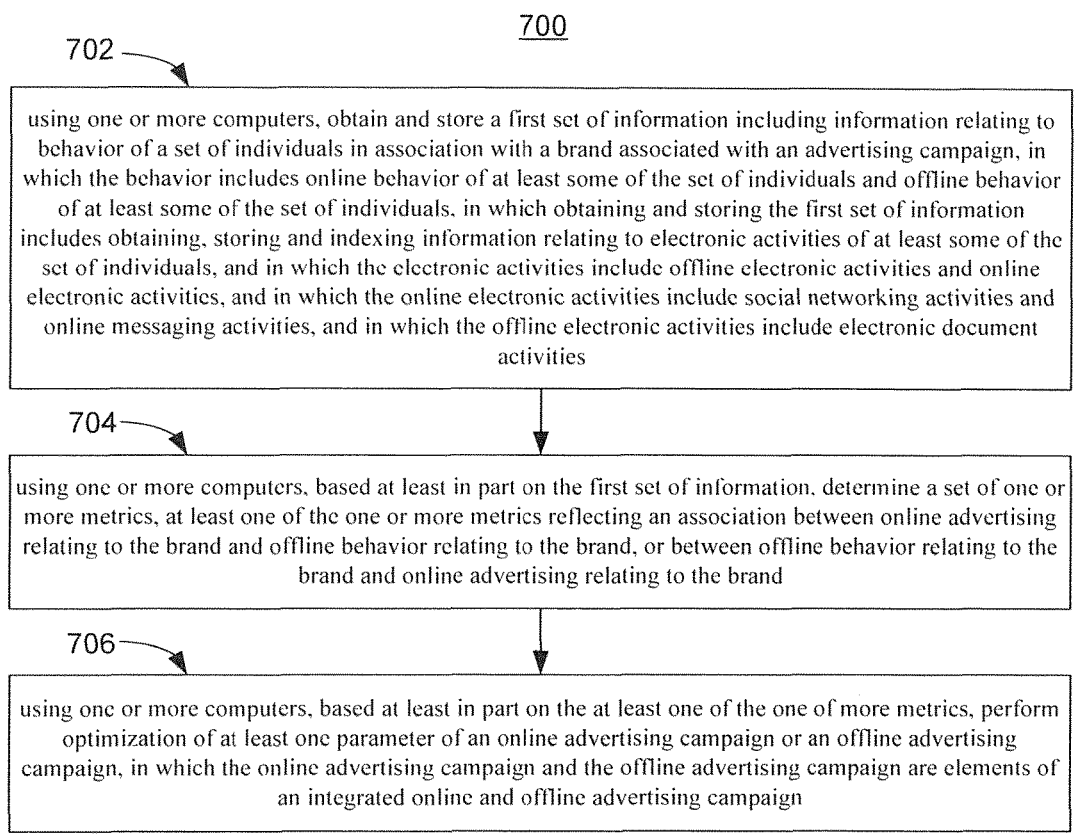
FIG. 7 is a flow diagram illustrating a method according to one embodiment of the invention.

FIG. 7 is a flow diagram illustrating a method 700 according to one embodiment of the invention. At step 702, using one or more computers, a first set of information is obtained and stored, including information relating to behavior of a set of individuals in association with a brand associated with an advertising campaign. The behavior includes online behavior of at least some of the set of individuals and offline behavior of at least some of the set of individuals. Obtaining and storing the first set of information includes obtaining, storing and indexing information relating to electronic activities of at least some of the set of individuals. The electronic activities include offline electronic activities and online electronic activities. The online electronic activities include social networking activities and online messaging activities. The offline electronic activities include electronic document activities.

At step 704, using one or ore computers, based at least in part on the first set of information, a set of one or more metrics is determined. At least one of the one or more metrics reflects an association between online advertising relating to the brand and offline behavior relating to the brand, or between offline advertising relating to the brand and online behavior relating to the brand. In some embodiments, the at least one of the one or ore metrics reflects an association between online advertising relating to the brand and online behavior relating to the brand, or between offline advertising relating to the brand and offline behavior relating to the brand.

At step 706, using one or more computers, based at least in part on the at least one of the one of more metrics, optimization is performed of at least one parameter of an online advertising campaign or an offline advertising campaign. The online advertising campaign and the offline advertising campaign are elements of an integrated online and offline advertising campaign.

Figure 8:
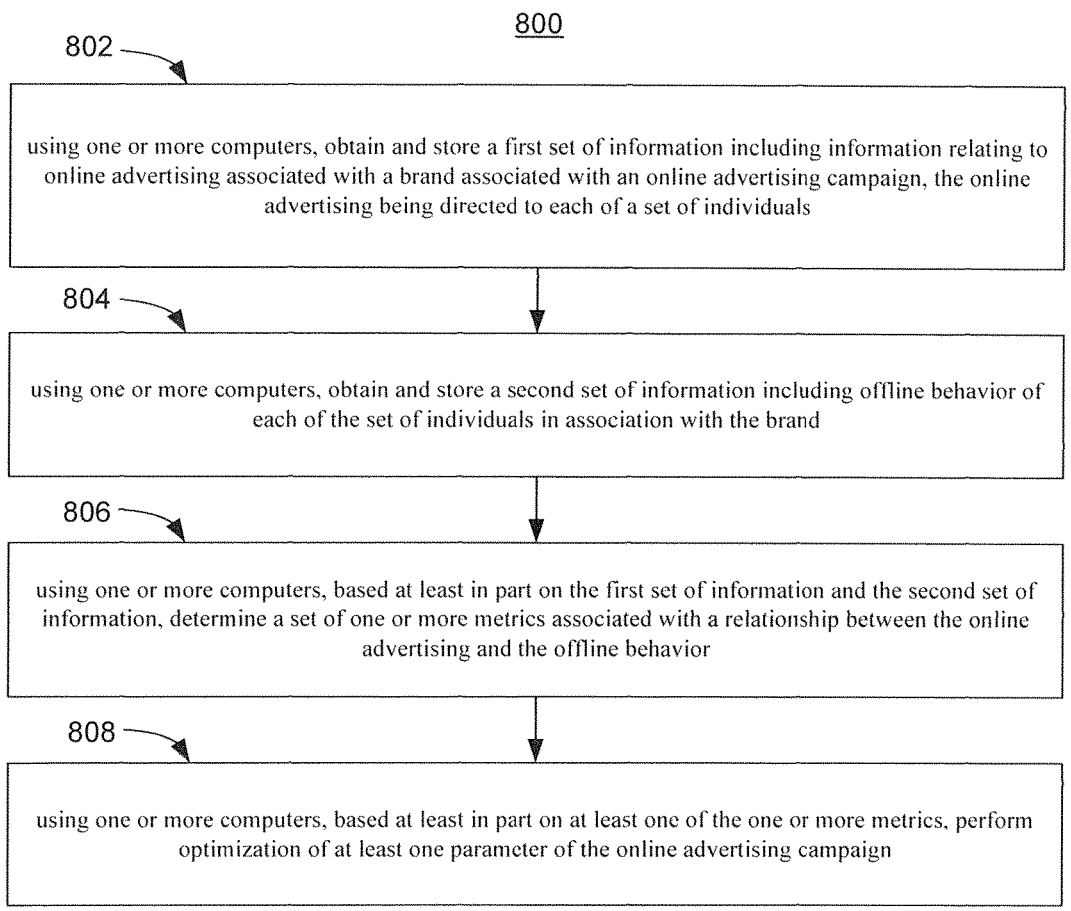
FIG. 8 is a flow diagram illustrating a method according to one embodiment of the invention.

FIG. 8 is a flow diagram illustrating a method 800 according to one embodiment of the invention. At step 802, using one or more computers, a first set of information is obtained and stored, including information relating to online advertising associated with a brand associated with an online advertising campaign, the online advertising being directed to each of a set of individuals.

At step 804, using one or more computers, a second set of information is obtained and stored, including offline behavior of each of the set of individuals in association with the brand.

At step 806, using one or more computers, based at least in part on the first set of information and the second set of information, a set of one or more metrics is determined, associated with a relationship between the online advertising and the offline behavior.

At step 808, using one or more computers, based at least in part on at least one of the one or more metrics, optimization is performed, of at least one parameter of the online advertising campaign.

Figure 9:
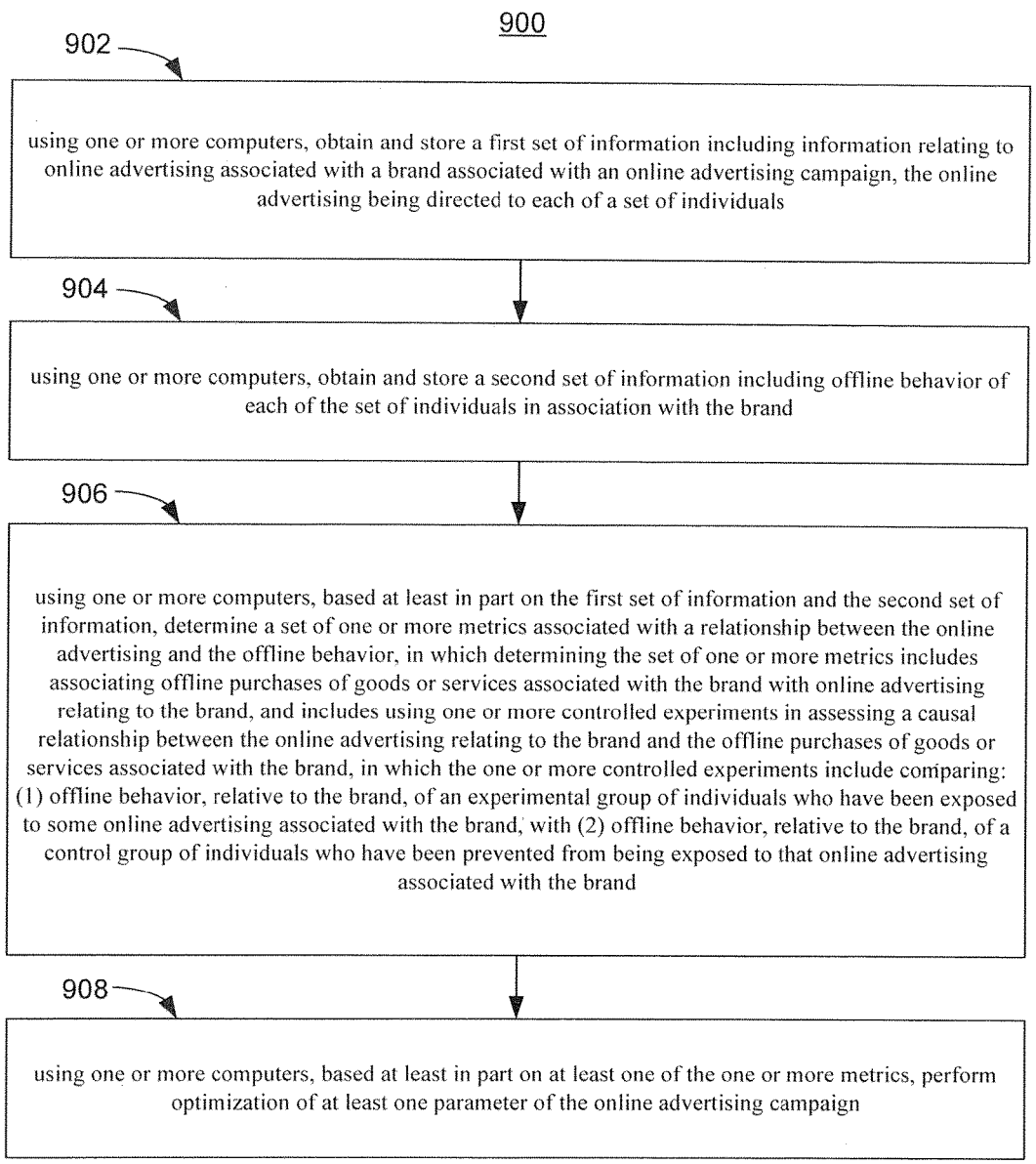
FIG. 9 is a flow diagram illustrating a method according to one embodiment of the invention.

FIG. 9 is a flow diagram illustrating a method 900 according to one embodiment of the invention. At step 902, using one or more computers, a first set of information is obtained and stored, including information relating to online advertising associated with a brand associated with an online advertising campaign, the online advertising being directed to each of a set of individuals.

At step 904, using one or more computers, a second set of information is obtained and stored, including offline behavior of each of the set of individuals in association with the brand.

At step 906, using one or more computers, based at least in part on the first set of information and the second set of information, a set of one or more metrics is determined, associated with a relationship between the online advertising and the offline behavior. Determining the set of one or more metrics includes associating offline purchases of goods or services associated with the brand with online advertising relating to the brand. Determining the set of one or more metrics further includes using one or more controlled experiments in assessing a causal relationship between the online advertising relating to the brand and the offline purchases of goods or services associated with the brand. The one or more controlled experiments include comparing: (1) offline behavior, relative to the brand, of an experimental group of individuals who have been exposed to some online advertising associated with the brand, with (2) offline behavior, relative to the brand, of a control group of individuals who have been prevented from being exposed to that online advertising associated with the brand. It is to be understood that, in some embodiments, while a control group user may be prevented from receiving online advertising associated with the brand, this does not necessarily mean that the control group user will not receive online advertising associated with the brand from any source. For instance, the experiment may be conducted by an entity that makes arrangements for or facilitates online advertising. It is possible that a control group user may be prevented from receiving online advertising associated with the brand, the online advertising in question being from the entity, but the control group user could possibly still be exposed to other online advertising associated with the brand, for example, from another entity or source.

Figure 10:
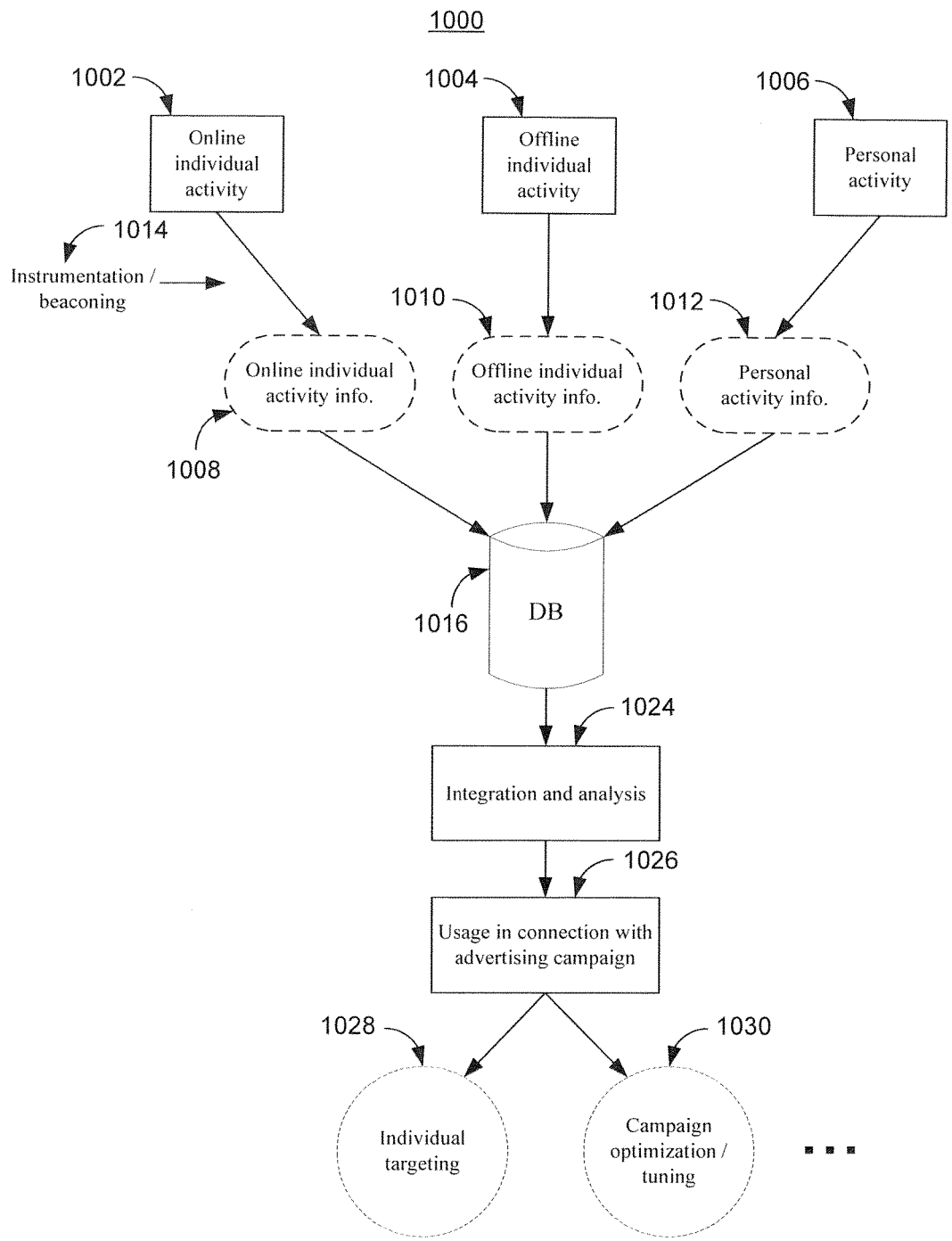
FIG. 10 is a block diagram illustrating one embodiment of the invention.

FIG. 10 is a block diagram 1000 illustrating one embodiment of the invention. In some embodiments, various types of individual or user behavior information is collected and used in advertising campaign optimization and targeting. As depicted, online activity 1002, offline activity 1004 and personal activity 1006 are beaconed or instrumented for monitoring and information collection. The collected information is depicted as online activity information 1008, offline activity information 1010 and personal activity information 1012. It is to be understood that, while depicted separately, the various types of activities 1002-1006 and information 1008-1012 may overlap, interrelate, etc.

Personal activities, and personal activity information, as the terms are used herein, can include an individual's "world" of electronic activity, whether online or offline, spanning various platforms, devices, applications and media, and including social interactions and social networking, searching, browsing, content consumption, etc. Personal activity information can even include other people's offline or online activity or communications as may be associated with or express something associated with the individual, or with the individual's communications, content, views, etc.

For example, personal activity information can include, among other things, an individual's communications such as email, instant messaging, texting, etc. Personal activity information can include an individual's user-generated content or social interactions, including, for example, communications or content in connection with a social networking site, including posts, blogs, tweets, reviews, comments, reactions, uploaded content, etc., as well as other people's feedback, replies, or responses to such, etc. Personal activity information can further include offline activity of the individual, including content, documents, files, interactions with various desktop or other device or platform applications, programs, etc. In some embodiments, personal activity information is actively monitored, collected, integrated, and indexed. In some embodiments, an individual may consent to or facilitate such, and may be incentivized or rewarded for doing so.

Furthermore, some embodiments of the invention include beaconing and instrumentation, both online and offline, to allow monitoring, collection, and storage of online activity information, offline activity information, and personal activity information. Offline activities could include store visits, purchases, service transactions, credit card logs, etc. Offline and online activities for particular individuals could be collected and integrated, which could include usage of matched online and offline unique identifiers. Measures could be taken to guard or ensure a desired level of privacy, such as by using proxy identifiers instead of actual personal login names or other sensitive identifying information, etc.

In some embodiments, marketing departments, customer relations databases, etc., associated with various industry segments, can be utilized in information collection.

The various activity information 1008-1012 is stored in one or more databases 1016. The activity information 1008-1012 is then integrated and analyzed, as depicted by block 1024. The integration and analysis can include associating various types of information on a per-individual basis, or on a per-category basis, as well as various types of modeling and analysis, which can also be done on a per-user basis, for example, in assessing and predicting behavior of individuals.

Block 1026 represents use of information determined at block 1024 in connection with an advertising campaign, such as in connection with management or optimization of an online advertising campaign, offline advertising campaign, or a larger campaign having online campaign and offline campaign elements.

Blocks 1028 and 1030 represent, respectively, examples of aspects of the usage depicted at block 1024, including in individual targeting and in advertising campaign optimization or tuning. Other aspects are contemplated as well, though not depicted.

Figure 11:
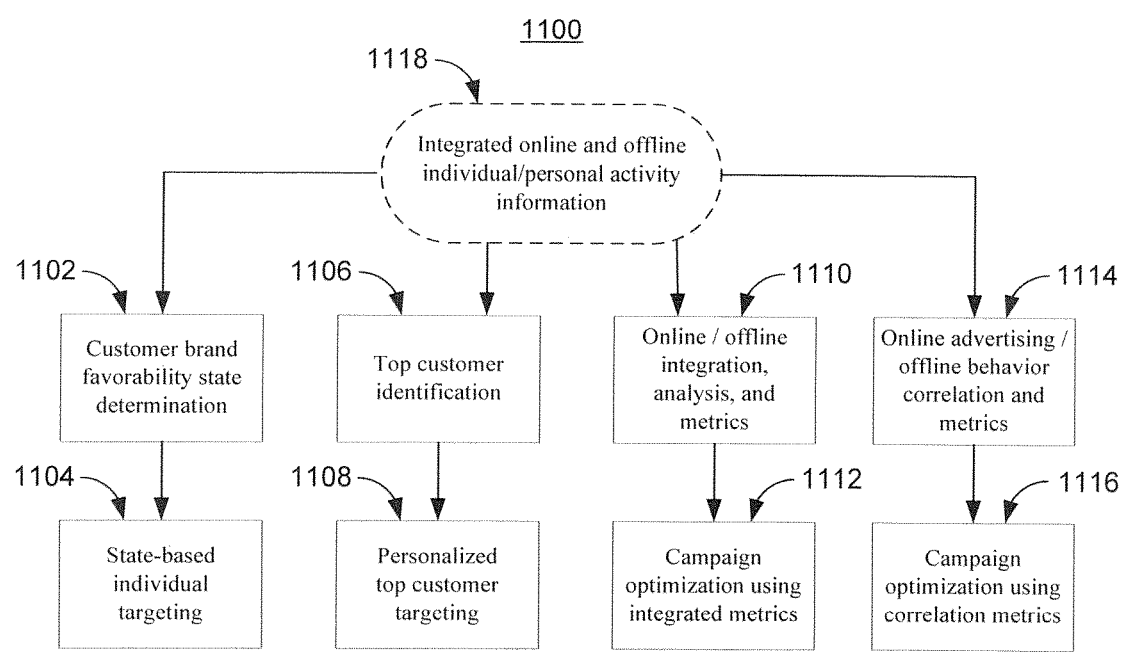
FIG. 11 is a block diagram illustrating one embodiment of the invention.

FIG. 11 is a block diagram 1100 illustrating one embodiment of the invention. Generally, FIG. 11 depicts various ways or areas in which integrated online, offline, and individual or personal activity information 1118, such as the information depicted in blocks 1008-1012 of FIG. 10, may be utilized.

Particularly, blocks 1102 and 1104 represent, respectively, usage of the information 1118 in customer brand favorability state determination and associated state-based individual targeting.

Blocks 1106 and 1108 represent, respectively, top customer identification and personalized top customer targeting.

Blocks 1110 and 1112 represent, respectively, online and offline activity information integration, analysis, and metrics, as well as campaign optimization using the determined metrics (including any informational assessment, determination, or measure). Generally, this can include mining patterns and making observations and inferences based on online and offline activity information considered together, in an integrated, holistic and sometimes synergistic fashion. This rich set of determined information can then be used in optimizing parameters of online and offline advertising campaigns or campaign elements, including spend, bidding, pricing, targeting, etc.

Blocks 1114 and 1116 represent, respectively, online advertising and offline behavior correlation and metrics, as well as campaign optimization using the determined metrics. This can include, for example, assessing and utilizing determined information relating to online advertising leading to offline conversions, and using such determined information in bidding, pricing, or payment associated with the online advertising campaign, for instance.

Figure 12:
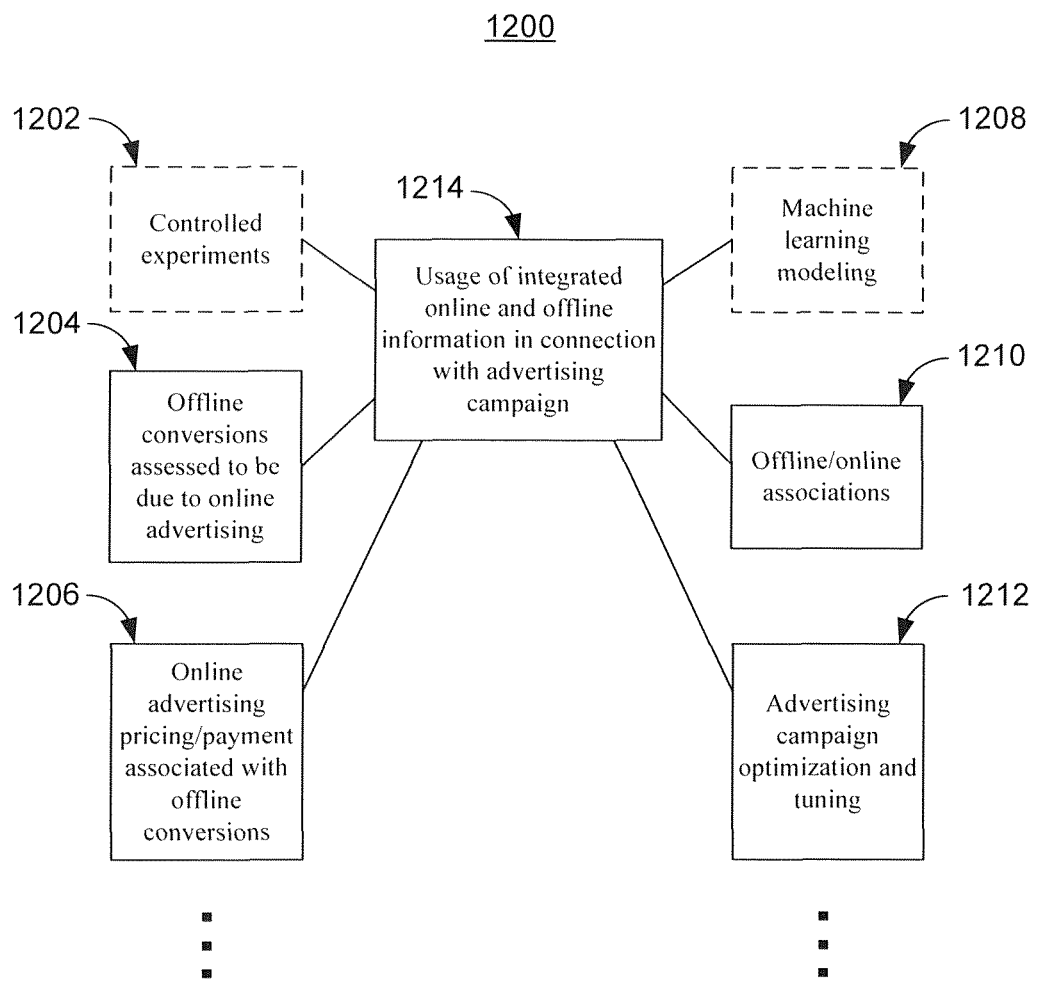
FIG. 12 is a block diagram illustrating one embodiment of the invention.

FIG. 12 is a block diagram 1200 illustrating one embodiment of the invention. Generally, FIG. 12 depicts examples of types and elements of usage of integrated online and offline information in connection with an advertising campaign according to some embodiments of the invention, although many other uses are contemplated.

Particularly, block 1204 represents offline conversions assessed to be due to online advertising. In some embodiments, one or more controlled experiments, as depicted by block 1202, can be used in such assessments. For example, in some embodiments, offline conversion behavior of two sets of individuals is compared. The groups can include a control group that is prevented from receiving particular online advertisements, such as online advertisements relating to a particular brand, and an experimental group, which is exposed to such advertisements. Variation in subsequent offline conversion behavior of members of the different groups can be used in assessing the impact of the online advertising on offline conversions, for instance. Such determining information or metrics can be used for various purposes in connection with an advertising campaign, including, for example, as depicted by block 1206, online advertising pricing that is based at least in part on actual, anticipated, or assessed associated offline conversions.

Block 1210 broadly represents determining or assessing associations between online and offline activity information, both of which can include personal activity information, as previously described, including associating offline and online activity information for a particular individual, for instance. Block 1210 is further intended to broadly include integration of such information. Block 1212 broadly represents use of the associated and integrated information in advertising campaign optimization and tuning, including offline and online campaigns or campaign elements. Various types of models and machine learning models, algorithms, clustering techniques, etc. can be used at blocks 1210 and 1212, for instance, for various purposes included assessing, patterning, and predicting individual interests, behavior, etc. Block 1208 represents a machine learning model, as one example.

Figure 13:
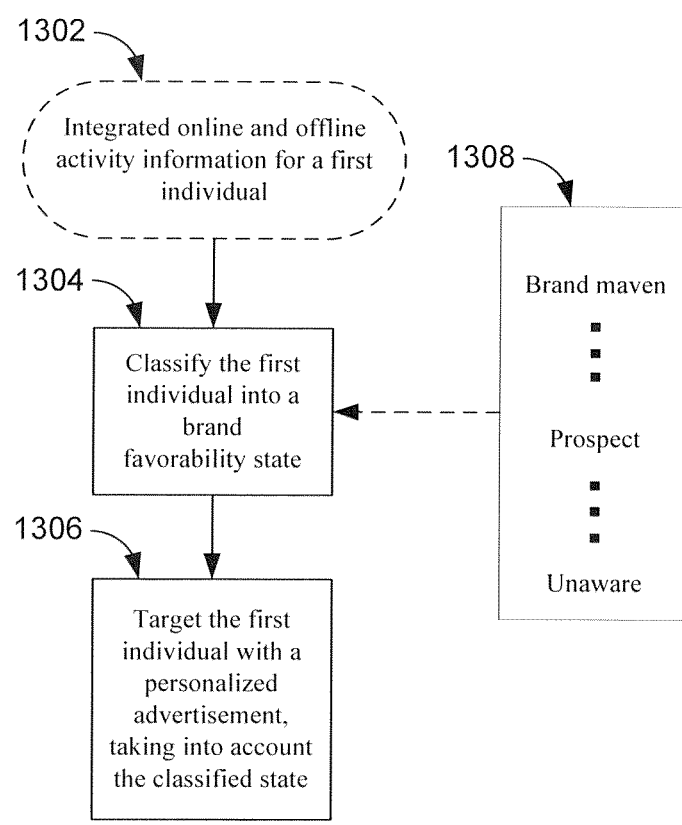
FIG. 13 is a block diagram illustrating one embodiment of the invention.

FIG. 13 is a block diagram 1300 illustrating one embodiment of individual state-based targeting according to one embodiment of the invention. Block 1302 represents collected integrated online and offline activity information for a first individual, which can include personal information as described herein. Block 1304 represents use of the information 1302 in classifying an individual into a brand favorability-associated state. Block 1306 represents targeting of the first individual with a personalized advertisement, taking into account the classified state, among potentially many other targeting attributes. Block 1308 represents a simplified example of tags or names that may be associated with particular states, running a spectrum between unaware to maven. Models, including probabilistic and machine learning models, and including state transition models incorporating patterns, time spent or likely in each state, etc., can be used in assessing and predicting an individual's state. Although discrete states are depicted, a continuous spectrum or scale, such as a stochastic or probabilistic model-based scale, is also contemplated in some embodiments. Furthermore, some embodiments of the invention contemplate various different types of discrete state or continuous models (including any representation, construct, etc). For example, more complex models than simply linearly progressive models are contemplated. In some embodiments, for example, branching, nodal/subnodal, tree-based, multiple path, Boolean or hierarchical models are contemplated, among others.

Figure 14:
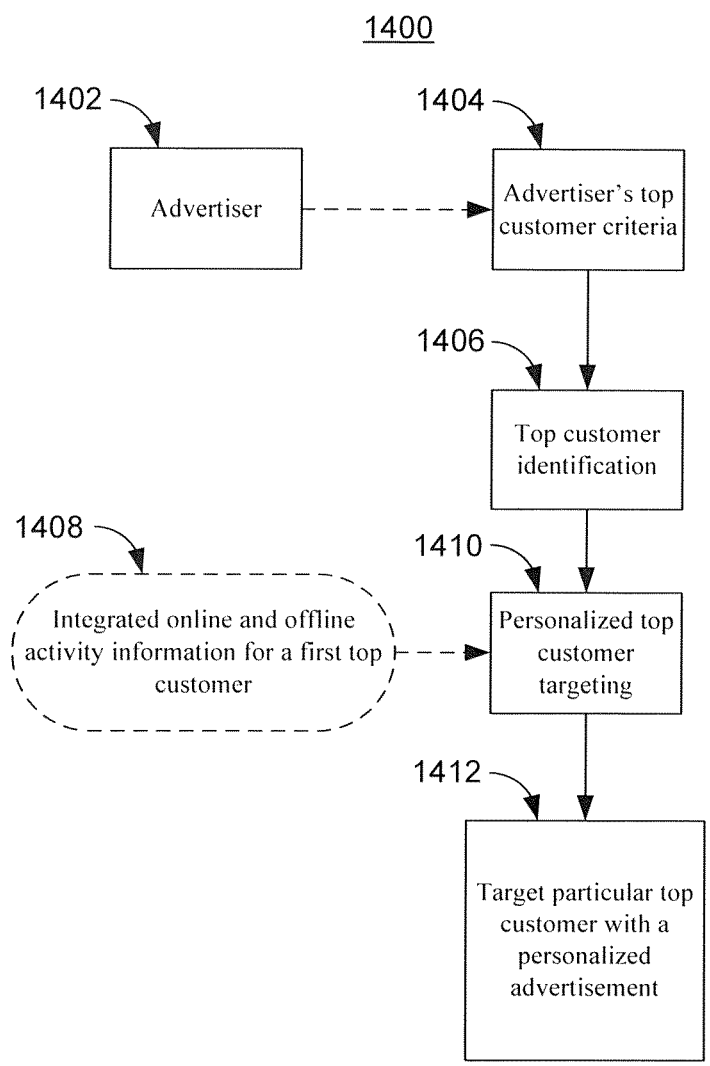
FIG. 14 is a block diagram illustrating one embodiments of the invention.

FIG. 14 is a block diagram 1400 illustrating top customer targeting according to one embodiment of the invention. As depicted, an advertiser 1402 supplies criteria 1404 by which top customers of the advertiser may be determined or identified, as represented by block 1406. Other variations are also possible, including the advertiser simply supplying a list of top customers, or the advertiser utilizing a third party for determining or supplying top customer criteria, etc. Block 1408 represents integrated online and offline activity information for a first top customer, which can include personal activity information as previously described, which is used in personalized top customer targeting, as represented by block 1410. Block 1412 represents targeting a particular top customer with a personalized advertisement, based at least in part on the information 1408.

Some embodiments of the invention provide techniques for targeting of online advertisements, including targeting based on a conversion-associated customer state, such as a brand-associated state or a brand favorability state. A conversion-associated state can broadly include a state relative to conversion or favorability regarding a particular brand or brands, including loyalty, awareness, etc. Some embodiments of the invention provide techniques for targeting advertisements to users based on their determined most probable state in association with a progressive state transition model, which may relate to brand responsiveness, awareness or favorability.

In some embodiments, state-based targeting allows, among other things, advertisers to use or set custom or personalized advertisement exposure levels or limits, based at least in part on the user's state.

For example, some embodiments go beyond providing frequency caps on a cookie (proxy for user) basis, available as a single value for a campaign. Some embodiments allow differentiation and segmentation of user sets based on brand favorability or conversion state, and allows frequency exposure controls or limits based at least in part on the user's state. For example, in some embodiments, exposure levels and controls can be on a state-based or even per-user level. In some embodiments, exposure controls can be determined based on an individual user's attributes including the user's favorability or conversion state. Furthermore, in some embodiments, online and offline user activity information, including personal activity information, is used in constructing profiles relating to the user, which profiles can include various states in relation to a particular profile type, subject or topic. For example, such profiles can include emotional profiles, demographic profiles, psychographic profiles, sensitivity profiles, etc. Model types can also include brand-associated profiles, company-specific customer service issues profiles, etc. Machine learning techniques and clustering techniques, for example, can be used in constructing or utilizing such models, or for making predictions based at least in part on the profiles.

In some embodiments, potential customers and customers of an advertiser can be viewed as progressing along a path of finite states of increasing favorability towards a brand or brands). User interaction activities, for example, in connection with the brand, can be used in this classification. Such interaction activities can include offline and online activities, and can include personal activities as previously described. In embodiments, advertisement selection, as well as personalization or customization, including selection of an advertisement from a group of associated advertisements, can be based at least in part on a targeted user's brand favorability or conversion state or predicted state at the anticipated time of serving of the advertisement. Targeting and advertisement selection can also be based at least in part on other profiles and predicted associated states of the user, among other things.

In some embodiments, a user brand favorability or conversion state transition model can be built using machine learning, which classifies users into particular states. For example, states could include, or be described by, the user being unaware, aware, a prospect, a convert, a repeat customer, an up-sellable customer, an at-retention-risk customer, a confirmed brand favorable customer, a respected influencer, a vocal influencer or maven, a self-proclaimed brand ambassador, etc. Furthermore, such models could include global models, industry-specific models, advertiser-specific models, etc.

The brand-associated state of a user can have great impact on the type of advertisement best served to the user. For instance, showing a conversion-seeking advertisement to a user who has already converted could be ineffective and even irritating. Yet, a personalized advertisement that thanks or reassures the user, making the user comfortable with his her decision, and perhaps also appealing to the emotional or other profile or state of the user, etc, might be very effective. As another example, a customer that is angry due to a bad experience could be shown a discount or win-back advertisement. In some embodiments, brand-associated state information is further utilized in optimally targeting particular users with advertisements relating to particular products or services, etc.

In some embodiments, brand-associated state information can be used in advertising campaign optimization. For example, in some embodiments, advertiser bidding, in an online advertising auction-based marketplace, can be adjusted based on the desirability or value of an opportunity in consideration of a predicted or assessed brand-associated state of the associated user, etc.

In some embodiments, advertisement performance, in connection with brand-associated state-based targeting and on an individual user level, is monitored. The monitored information can be analyzed, and advertisers can be provided with feedback and metrics accordingly. With state-specific advertisement performance information, advertisers can gain insight and perspective on how particular advertisements affect users in particular states and are associated with state transitions over time, how advertisements affect potential customers over time, etc. This feedback can be used to further optimize or tune campaigns, advertisements, targeting, etc., including advertising to optimally transition users along increasingly favorable brand-associated states, such as favorability states, etc.

In some embodiments, online, offline, and personal activity is beaconed or instrumented, captured, cleaned, joined, merged, and analyzed. Classification and machine learning techniques can be applied for user state assessment, prediction, etc. In some embodiments, user brand-associated state determination information is periodically stored to a data store, or database, which can be utilized in advertisement selection. In some embodiments, as a user visits an online property, the data store is used in determining the user's most likely brand-associated state, which can be an advertiser or industry-specific conversion state, etc. Such determinations can be utilized in determining or optimizing advertisement selection and bidding in connection with an opportunity or opportunities. Furthermore, in some embodiments, advertisers can specify custom frequency caps or controls, as well as custom messages in smart advertisements, etc.

Some embodiments of the invention provide techniques for targeting of online advertisements, including targeting of top customers of advertisers. In some embodiments, advertisers are provided with the ability to target specific top customers with personally relevant advertisements. Top customers may be selected based on offline, online, and personal activities. Furthermore, generally private customer information of an advertiser may be utilized.

Top customers may be selected, identified, or determined in many different ways. In some embodiments, an advertiser could specifically identify its top customers, based on whatever criteria the advertiser chooses. In some embodiments, the advertiser supplies criteria by which it or another party can select the top customers, or periodically do so.

Generally, top customers of an advertiser can represent a critical segment, where interactions can represent a deep and emotionally relevant dialog in connection with brands and the advertiser. Given the strategic value of this relationship, targeting such users with personally selected or tailored advertisements, as opposed to generic advertisements, can be critical. Some embodiments of the invention harness offline, online and personal activity information, as well as advertiser information, in targeting such customers. Furthermore, some embodiments also utilize brand favorability or conversion state targeting, emotional profile or emotional state-based targeting, and other various profile-based or state-based targeting techniques, several of which are described herein.

In some embodiments, cookies or registered IDs of users are mapped to top customers of an advertiser, which may be facilitated or accomplished by a third party. This information is used in advertisement targeting. In some embodiments, online cookies are tagged to be associated with the top customer segment. This can be used to facilitate collection, association and integration of offline activity, online activity and personal activity information associated with the top customer segment, as well as individual top customers. Advertisers or other parties can use this integrated information in determining an optimal advertisement, version of an advertisement, custom message in an advertisement, etc., to be served to the top customer segment, or to a particular top customer.

In some embodiments, advertisers are provided with a trusted mechanism to repeat or update this identification process periodically. Advertisers can be provided with an ability to provide relevant or optimal advertisements for the top customer segment, sub-segments therein, or individual top customers. Advertisement performance is monitored and collected, and used in providing advertisers with feedback, allowing advertisers to identify return associated with this precise or personalized targeting.

In some embodiments, during serving, association of cookies to advertisers' top customer segments are made, and used in advertisement selection. Furthermore, various advertising campaign parameters can be determined or adjusted based at least in part on top customer targeting factors. Such parameters can include bidding and bid adjustment in an online advertising auction-based marketplace. In some embodiments, for an advertiser utilizing a top customer targeting feature, or with such a feature active, bids are adjusted based on a determined value of top customers, or a particular top customer, to the advertiser, which can better optimize serving opportunity allocation, for instance.

In some embodiments, monitoring and collection of information, including performance information, in connection with top customer targeting, and analysis thereof, is used in providing advertisers with feedback. Such feedback could include information on the level of top customer targeting in an advertiser's campaign, and its effectiveness.

In some embodiments, advertisers make their top customer lists available to a certified tool or third party. The third party then maps these top customer users to individual cookies or registered user IDs on an advertisement serving platform domain. During advertisement selection, this tagging flags users that belong to a top customer list of any advertiser. Advertising can be targeted very specifically to particular top customers, for appropriate serving opportunities. This can include advertisement selection, advertisement customization or personalization, such as incorporation of a personalized message, etc. Serving could also reflect specific advertiser instructions in this and other regards. For example, an advertiser might select a particular advertisement for a customer determined to be angry but winnable, or in some other particular state or status. Brand-associated state targeting, other state-based targeting, and profile-based targeting can also be utilized. Advertiser feedback and reporting could include statistics and advertisement performance with regard to particular top customers, metrics on advertisement effectiveness, metrics on effects of advertising on brand favorability perception, etc.

In some embodiments, integration of offline and online information to be leveraged through a single campaign allows optimized campaign effectiveness with minimized management and logistical overhead.

Some embodiments provide techniques relating to advertising campaign optimization utilizing online and offline behavior information, such as in a unified, integrated, holistic or synergistic fashion. Some embodiments of the invention provide systems and methods including obtaining more comprehensive feedback, such as based on observable offline events, which can be used to tune online or offline campaigns.

Some embodiments of the invention include a recognition that, often, advertisers and campaign managers must continuously tune marketing mix allocations and campaign parameters to obtain the most favorable market responses for their specific campaign objectives. Such campaigns can span online and offline realms. Relevant online events can include, for example, conversions, clicks, sign-ups, registrations, etc. Relevant offline events can include, for example, store visits, store purchases, phone purchases, events that indicate brand or product awareness, or events that can signal emotional associations with a brand.

In some embodiments, online and offline campaign optimization is treated as a single unified problem, to produce optimal results. Furthermore, some embodiments of the invention recognize and make use of the fact that there is often a significant correlation or causality between, for example, offline events or outcomes and online campaigns. Such correlations and associations, including causal associations, can provide a strong signal for campaign optimization. Furthermore, online events and outcomes can provide meaningful feedback for tuning offline campaigns.

While online events are generally well-instrumented, offline events have not been. Some embodiments of the invention include instrumenting and collecting offline information, and using such information in an integrated and complementary manner with online information, in advertising campaign management and optimization. Some embodiments of the invention utilize offline outcome beacons as a feed for more holistic analysis of advertising campaign performance. In some embodiments, use of offline and online information is combined to allow optimal advertising campaign control and tuning decisions, for both online and offline campaigns.

Furthermore, some embodiments of the invention include utilizing collected online and offline information in obtaining insights on user behavior and user profiles, such as profiles of users that behave favorability relative to specific objectives, both online and offline. This information can then be used for tailoring specific campaigns, and for other purposes, such as, for example, determination of new services to provide users.

Some embodiments include managing offline information, including instrumenting, collecting, and feeding information in standard ways to allow it to be leveraged for analysis and campaign optimization. Offline instrumentation can include, for example, beaconing from point-of-sale systems such as cash registers, etc. In some embodiments, a trusted intermediary is used to ensure that privacy concerns are addressed. One or more intermediaries may also be utilized in data collection, transformation, and merging that may be required to inform an online advertising network of specific users' responses offline pertaining to an advertising campaign.

In some embodiments, advertisers can be provided with and benefit from analysis and insight gained from other advertisers' campaigns. Even before a particular advertiser advertises on a network, the advertiser could be provided with information based on other advertisers' campaign performance. For example, sources of syndicated data, such as on a per-vertical market basis, could be tapped for this. For example, in retail, large department stores could provide sales data for manufacturers in various categories. As another example, credit card companies could provide spend information from individual card accounts on various advertising customers. In some embodiments, custom data from advertisers, via a third party intermediary, or directly, can provide more tailored insights to tune and optimize campaigns.

In some embodiments, both online and offline events are instrumented. Combined user activities in various observable online and offline realms are processed. Offline events can include, for example, store visits, store market basket analysis, store transactions, credit card transactions, etc. Online events can include, for example, posts, reviews, articles, conversations, status or vitality updates, tweets, etc. User response profiles can be constructed that extend across online and offline realms, and account for interactions as well. Comprehensive profiles can be used in determining whether users are more likely to respond to advertisements that solicit online responses, such as, for example, online coupons and free shipping offers, or offline responses, such as, for example, local store promotions and advertisements relating to new season's products.

In some embodiments, infrastructure is provided, including infrastructure to support offline beaconing, information analysis, and serving modifications to incorporate offline, in addition to online, response rates. Logging techniques can be utilized to track offline activity, which information can then be associated and merged with online profile information. Reports can be generated that package and distribute insights to advertisers, such as on what specific settings of online campaigns result in online and offline performance on specific objectives of interest.

Some embodiments of the invention provide aspects including: (1) using offline observations and information to tune online campaigns; (2) using online observations and information to tune offline campaigns; (3) using online and offline observations and information to tune online campaigns; (4) using online and offline observations and information to tune offline campaigns; and, (5) offline and online observations and information in tuning offline and online campaigns. In some embodiments, online and offline information and observations are handled in a holistic, integrated fashion.

Some embodiments of the invention recognize that advertising networks have access to large amounts of valuable information for advertising campaign optimization purposes. Agents, however, have typically been trusted by advertisers with internal information, including information on offline outcomes, in order to manage and optimize campaigns. Some embodiments of the invention allow a single point or centralization of information collection and integration, and campaign management, tuning and optimization.

In some embodiments, online and offline information is used in generating comprehensive user response profiles. Various types of profiles can be constructed and utilized, as described herein, including brand-associated state profiles, emotional profiles, demographic profiles, psychographic profiles, etc. Such information and profiles can be used by a marketplace, advertisers, or both, in, for example, allocation of opportunities to particular advertisements, advertisement selection, and allowing advertisers to channel or divert marketing resources optimally to the right market channels and with the right settings.

In some embodiments, offline measures are utilized in constructing indices to advertiser-specific objectives, such as, for example, brand favorability and brand sensitivity. Additionally, many other types of metrics could be constructed that provide feedback for tuning advertiser marketing efforts. Brand sensitivity can help determine exposure levels per-user segment, or targeted user segment, to elicit the same level of response towards a brand. This can help determine the right channel and level of investment per target, across offline and online realms. Brand favorability can be used to help gauge the current relative levels and trends of the perception of the brand among the users targeted online and offline, using both online and offline measures.

In some embodiments, user activities offline, such as store visits, store purchases, credit card transactions, surveys taken, etc., are beaconed to a third party service that strips off private information. The third party may then join this data to cookies on the network, and then deliver a feed to the network that can essentially provide an offline feedback signal for analysis.

In some embodiments, users online are observed by an advertising network directly or using online beacons, such as advertisements clicked, conversions, etc. In some embodiments, efforts are made to essentially cast a wider net across the Web to be able to collate other non-observable online activities. In some embodiments, universal cookies are used in this regard.

In some embodiments, offline and online feedback signals on cookies or users are combined and used in constructing user profiles which are stored in a data store or database, and various profiles and perspectives on users can be combined or integrated. The profiles and other information can be used in predicting the likely online or offline response rates associated with individual users or cookies, in connection with advertisements. This and other information can be used in other functions, including marketplace functions such as ranking, pricing, advertisement selection and serving. The feedback signal can also be periodically analyzed and used in tuning a marketing budget allocation mix across online and offline marketing channels.

In some embodiments, feedback can be used in auto-optimization of advertising campaigns of advertisers, or can be provided to advertisers so that they can incorporate the information and insight into their marketing process to tune both online and offline campaigns.

In some embodiments, advertisers can also provide custom data feeds directly to networks, if sufficiently trusted, and certified tools or third parties can be used in maintaining sufficient privacy, such as by information using obfuscation, stripping, coding, encryption, or by other techniques.

In some embodiments, information and insight obtained by online and offline activity information collection and analysis can be used in audience discovery, such as in determining what types of users respond best on different channels, etc.

Some embodiments of the invention provide techniques relating to advertising campaign optimization, such as techniques that utilize offline behavior information in optimizing one or more online advertising campaign parameters, such as a pricing or a payment-associated parameter. Typically, advertisers may pay for online advertising based on online events such as impressions, clicks, conversions, etc. In some embodiments of the invention, methods and systems are provided for incorporating users' offline activities in evaluating, controlling and paying for online advertising. Some embodiments allow advertisers to use offline effects as a basis for payment for online advertising. For example, an automaker may pay for online advertising based on a determination or estimation of the number of additional cars sold as a result of that online advertising.

Some embodiments include a recognition that many advertisers want to use online advertising to achieve offline goals, including increasing offline sales and increasing favorable brand perception. Some embodiments allow advertisers to connect their online advertising choices to offline results. This can enhance the ability to measure the value and effectiveness of online advertising, and to adjust targeting to optimize the offline effects of online advertising. It can also make it possible for online advertisers and exchanges to optimize value for their inventory.

Some embodiments allow advertisers, publishers and exchanges to incorporate offline metrics into targeting decisions and payment arrangements for online advertising. In some embodiments, advertisers collect data on offline activities on a per-user basis, which data can be reconciled with users' advertisement views. This information can be used in adjusting the target audience for advertisements based on which users react most favorably to the advertisements, or to pay only when advertisement views have effected or are likely to have affected offline behavior. However, some advertisers may not have the ability, or may not have the desire, for informational privacy or other reasons, to share data on a per-user basis, and some embodiments of the invention relate to techniques that can be utilized without data reconciliation on a per-user basis.

Some embodiments provide techniques for reconciliation of online and offline data on a per-user basis. Techniques are also provided for use of such reconciled data to evaluate return on investment ("ROI"), adjust targeting, or determine pricing or payments for online advertising. In some embodiments, a publisher logs online events, such as advertisement views and clicks, on a per-user basis. An advertiser collects offline data, such as purchase history collected at point of sale, on a per-user basis. The publisher has identifying data for some of its users, and so does the advertiser. The identifying data are matched between publisher and advertiser, which can identify which publisher users are, or are likely to be, which advertiser users. The matching can be based on factors including, for example, email addresses, names, and physical addresses. After matching users, online and offline data are merged on a per-user basis.

In some embodiments, analysis of connections between online and offline activity is used to produce insights into offline user behavior in response to online advertising on a per-user basis and on a category basis, for categories such as, for example, age, gender, geographic area, and potentially many others. This data can then be used to evaluate the ROI of the associated campaign and its advertisements. The data can also be used to evaluate the effectiveness of the online advertising for different individual users and categories of users. This evaluation can be used, for example, to adjust targeting and to adjust which advertisements are shown to which users. The data can also be used as a basis for pricing or payment, in various ways.

In some embodiments, payments can be based on patterns of co-occurrence in which a user experiences an advertisement and then responds to it with some online activity, followed by the user completing specified offline activities such as in-store purchases.

In some embodiments, payments (or pricing) can be based on, or partly based on, the results of controlled experiments. For example, payments can be based on offline activity that controlled experiments indicate is caused by online advertising. For example, an online campaign for an automaker can be served to some users, who are randomly selected to form an experimental group, but not served to, or prevented from being served to, other users who may be randomly selected to be a control group. A level of later auto purchases is compared between the experimental group and the control group, and based on the difference, the level of auto purchases due to the online advertising can be statistically evaluated or assessed. The advertiser can pay based on the marginal auto purchasing determined to be caused, or attributed as being caused, by the online advertising.

Other forms of controlled experiments, or more complex controlled experiments, can also be utilized. In some embodiments, offline activity that controlled, designed experiments indicate is caused by synergy between online advertising and other forms of marketing may be utilized in determining payments.

In some embodiments, changes in brand perception may be used in place of, or in addition to, offline activity and used for evaluation of, management of, and payment for, online advertising. Such changes could be measured in various ways, such as online or offline surveys, or both.

In some embodiments, both offline and online data may be aggregated over multiple entities to increase the reach and depth of information and to provide standardized interfaces for merging online and offline data. For example, an exchange may aggregate online activity data over multiple publishers and advertisers, and a credit card company may aggregate offline sales data over multiple advertisers. The exchange and credit card company can develop normalized processes for merging the data, for paying to acquire the data, and for charging to use the data.

In some embodiments, third parties (other than the advertiser or publisher) may be enlisted to facilitate or perform various steps in various methods and processes. Third parties may be engaged, for example, because they provide expertise and capabilities, to provide a buffer to prevent publishers and advertisers from sharing user-level data with each other, or to provide a trusted neutral actor for measuring online or offline activity, particularly when the measurement affects payment.

Furthermore, in some embodiments, third parties could be engaged to assume the risk when advertisers pay on the basis of offline activity. The third party could pay the publisher based on online activity, and receive payment from the advertiser based on offline activity.

Some embodiments of the invention provide techniques for use in situations when data cannot be, or is not desired to be, reconciled on a per-user basis. For example, some advertisers may not wish to share offline data with publishers or third parties on a per-user basis. For such advertisers, a technique or process could be utilized or modified to collect offline data on a per category basis, such as, for example, on the basis of gender, age, geography, etc. This data can be merged with online data and analyzed to provide information that can be used to evaluate, control, and pay for online advertising. In such cases, the analysis can be on a per category basis, which can make the possibilities for evaluation, control and payment less granular.

In some embodiments, even if the advertiser keeps its method of determining payment secret from the publisher but pays periodically, the publisher can use the payment information to perform some optimization. For example, the publisher can adopt a policy of showing the advertiser's advertisements online for a first time period, and then tune the amount of impressions to show in subsequent time periods based on payments in previous time periods. For example, the publisher can show the advertiser's advertisements at some level for a first time period, increase it for a second time period, and use the difference in payments for those time periods divided by the difference in the number of impressions as an estimate for future payments for marginal impressions. Furthermore, the publisher can tune targeting by running the advertiser's advertisements with different targeting over different time periods to assess which targeting causes increased payments. In some embodiments, by using designed experiments, the advertiser can evaluate the influence of multiple targeting factors and multiple advertisements.

While the invention is described with reference to the above drawings, the drawings are intended to be illustrative, and the invention contemplates other embodiments within the spirit of the invention.

The invention claimed is:

1. A method comprising:

tracking by online and offline data aggregators and intermediaries including advertisers and publishers, online behavior of each of a set of individuals including activity on publisher sites and offline behavior including purchase history collected at point of sale, wherein online behavior includes events that signal emotional associations with a brand, wherein the each of a set of individuals is associated at least in part with an online cookie and tags indicating top customers and a possible state ranging between unaware and maven;

providing an interface for the online and offline data aggregators and intermediaries, configured to merge the online behavior and the offline behavior, wherein merging is performed based on a normalized process and depending on advertiser preference including on a per-user basis in some cases and a per category basis in other cases, and wherein the online cookie is tagged to be associated with a customer segment based on mapping customers from a list of customers provided by the advertiser to individuals from the set of individuals;

formatting into a user profile and storing in a customer relations database, a first set of information comprising information relating to behavior of each of a set of individuals indicated by proxy identifiers and based on the merged online behavior and offline behavior in association with a first brand associated with a first advertiser, wherein the behavior comprises the online behavior of at least some of the set of individuals and the offline behavior of at least some of the set of individuals;

formatting into a user profile and storing in the customer relations database, a second set of information comprising a set of possible states indicated by tags, of customers indicated by proxy identifiers of the first advertiser and potential customers indicated by proxy identifiers of the first advertiser and based on the merged online behavior and offline behavior, relative to conversion and user interaction activities in association with the first brand from the merged online behavior and offline behavior;

based on information of the first set of information and user interaction activities, classifying each of the set of individuals into at least one state of the set of possible states and storing resulting classifications in the customer relations database; and targeting with a particular personalized advertisement a first individual of the set of individuals based at least in part on the customer segment, the tags and the classified state of the set of possible states into which the first individual of the set of individuals is classified, wherein the particular personalized advertisement is selected based on an emotional state of the first individual indicated by at least one of the customer segment, the tags and the classified state of the first individual, and transmitting over a wireless communication channel to an electronic user device associated with the first individual a formatted online advertisement associated with the first brand.

2. The method of claim 1, comprising classifying the first individual into a state of the set of possible states based at least in part on offline behavior of the first individual relative to the first brand and online behavior of the first individual relative to the first brand.

3. The method of claim 1, wherein the advertisement is an online advertisement, and comprising, based at least in part on the targeting, facilitating serving of the advertisement to the first individual.

4. The method of claim 1, wherein the advertisement is an online advertisement, and comprising, based at least in part on the targeting, serving of the advertisement to the first individual.

5. The method of claim 1, wherein obtaining and storing a first set of information further comprises determining a personalized set of information, the personalized set of information being personalized with regard to the first individual, wherein the personalized set of information comprises indexed information relating to electronic activities of the first user, and wherein the electronic activities include offline electronic activities and online electronic activities, and wherein the online electronic activities include activities associated with social networking.

6. The method of claim 1, wherein obtaining and storing a second set of information comprises obtaining and storing a set of possible states, of customers of the first advertiser and potential customers of the first advertiser, relative to conversion in association with the first brand, and wherein the set of possible states comprises states associated with favorability of customers and potential customers relative to the first brand.

7. The method of claim 1, wherein obtaining and storing a second set of information comprises obtaining and storing a set of possible states, of customers of the first advertiser and potential customers of the first advertiser, relative to conversion in association with the first brand, and wherein the set of possible states comprises states associated with a degree to which customers and potential customers are favorably or unfavorably disposed relative to the first brand.

8. The method of claim 1, wherein obtaining and storing a second set of information comprises obtaining and storing a set of possible states, of customers of the first advertiser and potential customers of the first advertiser, relative to conversion in association with the first brand, and wherein the set of possible states comprises states associated with a degree to which customers and potential customers are favorably or unfavorably disposed relative to the first brand, and wherein targeting comprises avoiding overexposure of the first individual to advertising relating to the first brand, wherein overexposure is determined relative to a state, of the set of possible states, into which the first individual is classified.

9. The method of claim 1, wherein the targeting comprises utilizing an emotional state into which the first individual is classified.

10. The method of claim 1, wherein the targeting comprises utilizing an emotional profile of the first individual and an emotional state into which the first individual is classified based at least in part on the emotional profile.

11. The method of claim 1, wherein the targeting comprises utilizing a psychographic profile of the first individual.

12. The method of claim 1, comprising using a state transition model in classifying individuals of the set of individuals into states of the set of possible states, and comprising using a machine learning technique in generating the state transition model.

13. The method of claim 1, comprising providing the first advertiser with advertising campaign-associated metrics based at least in part on the first set of information and at least in part on advertisement performance in association with individuals of the set of individuals, and comprising providing the first advertiser with at least one tool for allowing advertising campaign tuning based at least in part on the metrics.

14. A system comprising:
one or more server computers coupled to a wireless network coupled to the Internet; and
one or more customer relations databases coupled to the one or more servers;
wherein the one or more server computers are configured for:
tracking by online and offline data aggregators and intermediaries including advertisers and publishers, online behavior of each of a set of individuals including activity on publisher sites and offline behavior including purchase history collected at point of sale, wherein online behavior includes events that signal emotional associations with a brand, wherein the each of a set of individuals is associated at least in part with an online cookie and tags indicating top customers and a possible state ranging between unaware and maven;
providing an interface for the online and offline data aggregators and intermediaries, configured to merge the online behavior and the offline behavior, wherein merging is performed based on a normalized process and depending on advertiser preference including on a per-user basis in some cases and a per category basis in other cases, and wherein the online cookie is tagged to be associated with a customer segment based on mapping customers from a list of customers provided by the advertiser to individuals from the set of individuals;
formatting into a user profile and storing, in at least one of the one or more customer relations databases, a first set of information comprising information relating to behavior of each of a set of individuals indicated by proxy identifiers and based on the merged online behavior and offline behavior in association with a first brand associated with a first advertiser, wherein the behavior comprises the online behavior of at least some of the set of individuals and the offline behavior of at least some of the set of individuals;
formatting into a user profile and storing, in at least one of the one or more customer relations databases, a second set of information comprising a set of possible states indicated by tags, of customers indicated by proxy identifiers of the first advertiser and based on the merged online behavior and offline behavior, and potential customers indicated by proxy identifiers of the first advertiser, relative to conversion and user interaction activities in association with the first brand from the merged online behavior and offline behavior;
based on information of the first set of information and user interaction activities, classifying each of the set of individuals into at least one state of the set of possible states and storing resulting classifications in the customer relations database; and
targeting with a personalized advertisement a first individual of the set of individuals based at least in part on the customer segment, the tags and the classified state of the set of states into which the first individual of the set of individuals is classified, wherein the particular personalized advertisement is selected based on an emotional state of the first individual indicated by at least one of the customer segment, the tags and the classified state of the first individual, and transmitting over a wireless communication channel to an electronic user device associated with the first individual a formatted online advertisement associated with the first brand.

15. The system of claim 14, wherein the one or more servers are coupled to the Internet.

16. The system of claim 14, comprising classifying the first individual into a state of the set of states based at least in part on offline behavior of the first individual relative to the first brand and online behavior of the first user relative to the first brand.

17. A non-transitory computer readable medium containing instructions for executing a method comprising:
tracking by online and offline data aggregators and intermediaries including advertisers and publishers, online behavior of each of a set of individuals including activity on publisher sites and offline behavior including purchase history collected at point of sale, wherein online behavior includes events that signal emotional associations with a brand, wherein the each of a set of individuals is associated at least in part with an online cookie and tags indicating top customers and a possible state ranging between unaware and maven;
providing an interface for the online and offline data aggregators and intermediaries, configured to merge the online behavior and the offline behavior, wherein merging is performed based on a normalized process and depending on advertiser preference including on a per-user basis in some cases and a per category basis in other cases, and wherein the online cookie is tagged to be associated with a customer segment based on mapping customers from a list of customers provided by the advertiser to individuals from the set of individuals;
formatting into a user profile and storing in a customer relations database, a first set of information comprising information relating to behavior of each of a set of individuals indicated by proxy identifiers and based on the merged online behavior and offline behavior in association with a first brand associated with a first advertiser, wherein the behavior comprises the online behavior of at least some of the set of individuals and the offline behavior of at least some of the set of individuals;
wherein the first set of information comprises information relating to offline and online behavior of a first individual of the set of individuals, and wherein the first set of information comprises a personalized set of information, the personalized set of information being personalized with regard to a first individual of the set of individuals, wherein the personalized set of information comprises indexed information relating to electronic activities of the first individual, and wherein the electronic activities include offline electronic activities and online electronic activities, and wherein the online electronic activities include activities associated with social networking;
formatting into a user profile and storing in the customer relations database, a second set of information comprising a set of possible states indicated by tags, of customers indicated by proxy identifiers of the first advertiser and potential customers indicated by proxy identifiers of the first advertiser and based on the merged online behavior and offline behavior, relative to conversion and user interaction activities in association with the first brand from the merged online behavior and offline behavior;
based on information of the first set of information and user interaction activities, classifying each of the set of individuals into at least one state of the set of possible states and storing resulting classifications in the customer relations database; and
targeting with a personalized advertisement a first individual of the set of individuals based at least in part on the customer segment, the tags and the classified state of the set of possible states into which the first individual is classified, wherein the particular personalized advertisement is selected based on an emotional state of the first individual indicated by at least one of the customer segment, the tags and the classified state of the first individual, and transmitting over a wireless communication channel to an electronic user device associated with the first individual a formatted online advertisement associated with the first brand.

18. The method of claim 1, wherein a particular personalized advertisement includes a personalized message indicating conversion-seeking when at least one of the customer segment, the tags and the classified state indicates that the first individual has not previously converted.

19. The method of claim 1, wherein a particular personalized advertisement includes a personalized message reassuring the first individual of a decision to convert when at least one of the customer segment, the tags and the classified state indicates that the first individual has previously converted.

20. The method of claim 1, wherein a particular personalized advertisement includes a personalized message attempting to win back with a discount when at least one of the customer segment, the tags and the classified state indicates that the first individual is angry due to a bad experience.

* * * * *